(12) United States Patent
Hildebrand et al.

(10) Patent No.: US 7,983,870 B2
(45) Date of Patent: Jul. 19, 2011

(54) INTEGRATED CIRCUIT AND METHOD FOR DETERMINING THE OPERATING RANGE OF AN INTEGRATED CIRCUIT

(75) Inventors: Uwe Hildebrand, Erlangen (DE); Peter Mahrla, Zorneding (DE); Knut Just, Unterschleissheim (DE); Michael Dolle, Grasbrunn (DE); David Sellar, Munich (DE)

(73) Assignee: Infineon Technologies AG (DE)

( * ) Notice: Subject to any disclaimer, the term of this patent is extended or adjusted under 35 U.S.C. 154(b) by 337 days.

(21) Appl. No.: 11/688,976

(22) Filed: Mar. 21, 2007

(65) Prior Publication Data

US 2008/0077348 A1    Mar. 27, 2008

(30) Foreign Application Priority Data

Mar. 27, 2006    (DE) .......................... 10 2006 014 037

(51) Int. Cl.
*G01R 31/14*    (2006.01)

(52) U.S. Cl. ..................................... 702/117

(58) Field of Classification Search .............. 702/57–60, 702/63–66, 71, 73, 75, 80, 90, 117–120, 702/182–184, 188, 189, 193; 340/664; 324/158.1, 324/765; 323/265
See application file for complete search history.

(56) References Cited

U.S. PATENT DOCUMENTS

| 5,130,645 A * | 7/1992 | Levy ........................... 324/158.1 |
| 6,104,304 A * | 8/2000 | Clark et al. .................... 340/664 |
| 7,583,555 B2 * | 9/2009 | Kang et al. ..................... 365/226 |
| 2005/0251700 A1 | 11/2005 | Henderson et al. |
| 2006/0153253 A1 * | 7/2006 | Diffily et al. ............... 372/29.02 |

* cited by examiner

*Primary Examiner* — Mohamed Charioui
(74) *Attorney, Agent, or Firm* — Dickstein Shapiro LLP

(57) ABSTRACT

Method for ascertaining an operating range for an integrated circuit which has a plurality of system components, in which a test routine is performed for testing at least one system component from the plurality of system components, where the at least one system component is not in operation and at least one other untested system component from the plurality of system components is ready for operation when the at least one system component is tested.

36 Claims, 4 Drawing Sheets

FIG 2

| Clock domain | Frequency setting | Voltage level | | |
| --- | --- | --- | --- | --- |
| | | @$\Delta T_1$ | ... | @$\Delta T_n$ |
| clk_a | CLK_A_FREQ_x | V_LEVEL_x | ... | V_LEVEL_x |
| | CLK_A_FREQ_y | V_LEVEL_x | ... | V_LEVEL_y |
| | CLK_A_FREQ_z | V_LEVEL_y | ... | V_LEVEL_z |
| clk_b | CLK_B_FREQ_x | V_LEVEL_x | ... | V_LEVEL_x |
| | CLK_B_FREQ_y | V_LEVEL_y | ... | V_LEVEL_y |
| clk_c | CLK_C_FREQ_x | V_LEVEL_x | ... | V_LEVEL_y |
| | CLK_C_FREQ_y | V_LEVEL_y | ... | V_LEVEL_y |
| | CLK_C_FREQ_z | V_LEVEL_z | ... | V_LEVEL_z |

INTEGRATED CIRCUIT AND METHOD FOR DETERMINING THE OPERATING RANGE OF AN INTEGRATED CIRCUIT

CROSS-REFERENCE TO RELATED APPLICATION

This application claims priority to German Patent Application Serial No. 10 2006 014 037.0-53, which was filed Mar. 27, 2006, and is incorporated herein by reference in its entirety.

TECHNICAL FIELD

The invention relates to an integrated circuit and to methods for ascertaining an operating range for an integrated circuit.

BACKGROUND OF THE INVENTION

In the case of mobile electronic appliances, it is desirable to achieve the lowest power consumption possible, for example in order to prevent storage batteries from having to be charged disagreeably often.

BRIEF DESCRIPTION OF THE FIGURES

Exemplary embodiments of the invention are illustrated in the figures and are explained in more detail below.

FIG. 2 shows a lookup table in line with one exemplary embodiment of the invention.

DETAILED DESCRIPTION OF THE INVENTION

Figure 1:
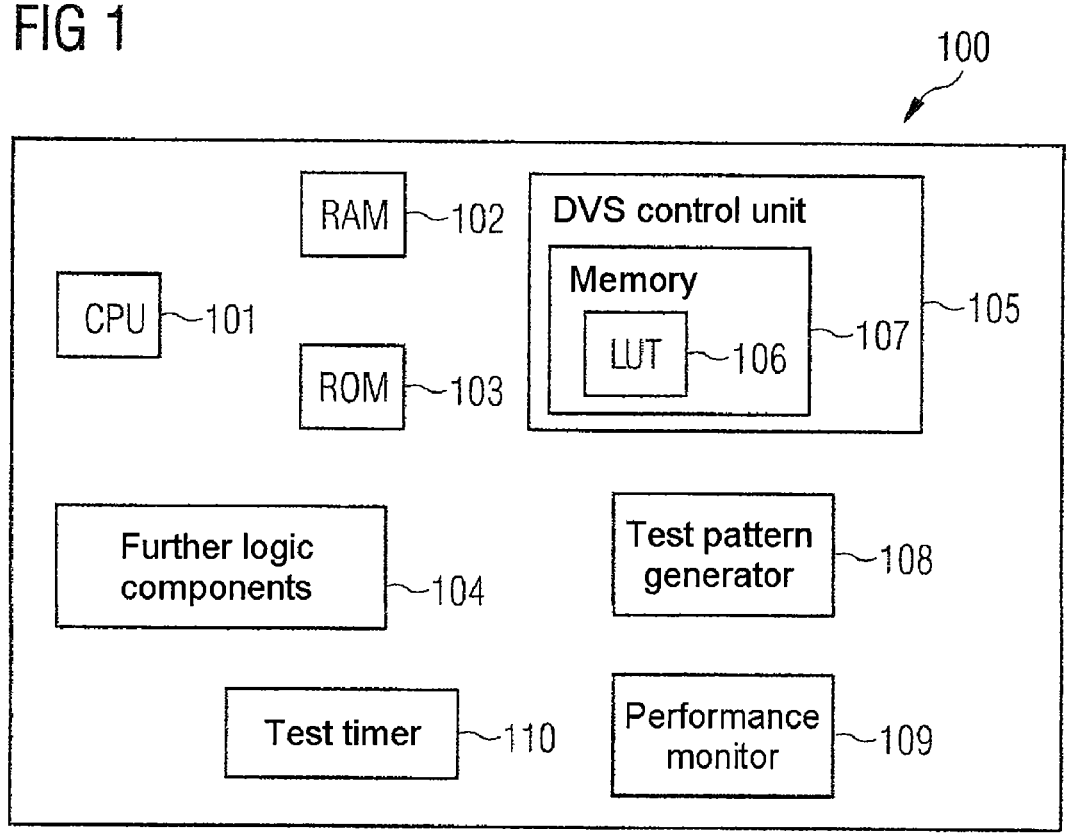
FIG. 1 shows an integrated circuit in line with one exemplary embodiment of the invention.

In mobile electronic appliances, such as mobile radio subscriber appliances and PDAs (Personal Digital Assistants), it is important for the power consumption to be as low as possible, since these appliances are usually powered by storage batteries and it is meant to be unnecessary for these to have to be charged inconveniently. One possibility for achieving low power consumption is for a mobile electronic appliance to use an integrated circuit which implements a system on chip (SoC) and, in particular, provides a microprocessor for the mobile electronic appliance in which the system implemented by the integrated circuit supports dynamic voltage scaling (DVS).

In a system which supports dynamic voltage scaling, the voltage level for each system power domain for which the dynamic voltage scaling is activated is dynamically scaled to the present power requirements. A present power requirement is characterized by a minimum clock frequency which needs to be set in order to be able to produce the currently required computation power.

Dynamic voltage scaling is implemented using a lookup table (LUT), for example. Such a lookup table indicates, for a plurality of clock frequencies (or a plurality of clock frequency ranges) possibly on the basis of an operating temperature for the integrated circuit, a voltage level which needs to be set for the respective clock frequency (or in the respective clock frequency range) so that the system implemented by the integrated circuit operates correctly.

If the integrated circuit has a plurality of clock frequency domains, that is to say a plurality of domains which can be clocked independently of one another, then the lookup table can have such an association between the clock frequency and the voltage level (possibly depending on the operating temperature) for each clock frequency domain.

Before a system can actually perform dynamic voltage scaling, the lookup table needs to be in place, that is to say the entries in the lookup table need to be in place.

This can be done on a design basis, that is to say on the basis of static timing analysis (STA) for cell libraries for worst case timing conditions. However, the lookup table created in this way is inefficient in the case of a computer chip, which does not have worst case properties, and the power consumption cannot be reduced by the dynamic voltage scaling to the extent that the properties of the computer chip would actually allow.

In line with one embodiment of the invention, a way is provided for generating entries in the lookup table flexibly, so that efficient dynamic voltage scaling can be ensured.

In line with one embodiment of the invention, a method for ascertaining an operating range for an integrated circuit which has a plurality of system components is provided in which a test routine is performed for testing at least one system component from the plurality of system components, where the at least one system component is not in operation when the at least one system component is tested, and where at least one other untested system component from the plurality of system components is ready for operation when the at least one system component is tested.

In line with another embodiment of the invention, a method for ascertaining an operating range for an integrated circuit having a plurality of system components is provided in which at least one system component from the plurality of system components provides a test procedure and where the test procedure is taken as a basis for testing at least one further system component from the plurality of system components at a plurality of supply voltages and a plurality of operating frequencies for the at least one further system component.

In addition, one embodiment of the invention provides an integrated circuit based on this method for ascertaining an operating range for an integrated circuit.

Clearly, exemplary embodiments of the invention allow the functionality of an integrated circuit to be checked when the integrated circuit is already in use, for example is incorporated in the electronic appliance in which it is intended to be used. This is achieved by testing a system component while at least one other system component in the integrated circuit is ready for operation and/or by virtue of a system component in an integrated circuit itself providing a test routine for testing at least one system component.

In one embodiment, it is not possible to tell from outside of the integrated circuit that the test routine is being performed (except for any setting of an operating point at which the test routine is performed, for example setting of a supply voltage). The logic operation of the integrated circuit remains uninfluenced by the performance of the test routine as seen from the outside. By way of example, only a relatively small state space in the integrated circuit is blocked.

At least one system component can be tested in order to create a lookup table which is used in the course of a method for dynamic voltage scaling (DVS), but also for other purposes, for example for a general function test for the integrated circuit, for searching for errors, etc.

Testing the integrated circuit when the integrated circuit is already in use, as permitted by exemplary embodiments of the invention, allows the detection of changes in the response of the integrated circuit through environmental influences such as the ambient temperature or air humidity to which the integrated circuit is exposed in use, or through ageing effects. If exemplary embodiments of the invention are used to create a lookup table for DVS then particularly the lookup table, provided that it is stored in an overwritable memory in the integrated circuit, can be scaled to the detected changes in the response of the integrated circuit.

This allows malfunctions to be avoided. If ageing effects or permanently damaging environmental influences mean that, for a particular clock frequency, a higher operating voltage is required for correct operation of the integrated circuit after the integrated circuit has been operating for some time than at the start of use of the integrated circuit then this can be detected and the lookup table can be updated, so that correct operation is ensured.

In addition, the lookup table can be updated for optimization, so that the power saving achieved through the dynamic voltage scaling is increased. When the integrated circuit is tested, it is possible to establish, by way of example, that correct operation at a particular clock frequency does not require such a high operating voltage after all as was expected at the start of use of the integrated circuit or directly after production. Accordingly, the lookup table can be scaled and thus improved dynamic voltage scaling can be performed. In particular, it is possible to create a lookup table which has improved the DVS in comparison with a lookup table which is based on the adoption of a worst case process. When exemplary embodiments of the invention are used, it is also not necessary to establish a process class for the integrated circuit in order to achieve a higher level of efficiency for the DVS in comparison with the adoption of a worst case process. Since determining the process class using a test system requires a long test period, exemplary embodiments of the invention can therefore be used to achieve costs for this case without efficiency drawbacks with regard to DVS.

Clearly, a lookup table can be created by setting an operating point at which the integrated circuit is tested. The operating point is then altered in steps, for example the clock frequency is held and the operating voltage is reduced in steps, and after every step the integrated circuit is tested. The last operating point at which the test on the integrated circuit delivered the correct result, that is to say the lowest operating voltage at which the integrated circuit works correctly at a prescribed clock frequency, for example, is entered into the lookup table for use within the context of the DVS.

The integrated circuit may have a microprocessor and may be a baseband chip for mobile radio telephones, for example. Alternatively, the integrated circuit may be a memory chip.

Exemplary embodiments of the invention can be found in the dependent claims. The further refinements of the invention, which are described in connection with one of the methods for ascertaining an operating range for an integrated circuit, also apply mutatis mutandis to the integrated circuit.

In the case of the method mentioned first above which is provided, the test result from a test routine can be taken as a basis for ascertaining whether the at least one system component is operating correctly.

In one embodiment, the test routine for testing the at least one system component is performed for various values of influencing parameters which influence the response of the integrated circuit. The influencing parameters may be adjustable and/or registerable. Registerable influencing parameters are the integrated circuit's operating age or the operating temperature, for example. For the purpose of registering a registerable influencing parameter, a sensor may be provided on or in the integrated circuit, for example a temperature sensor. Execution of the test routine may be initiated, for example, when a particular state has been reached, a time period has elapsed and/or a registerable influencing parameter drops below or exceeds a prescribed threshold value. An adjustable influencing parameter is a well bias voltage or an operating current for a component, for example.

By way of example, the test routine can be performed in order to test the at least one system component at a plurality of supply voltages and a plurality of operating frequencies for the at least one system component.

On the basis of the performance of the test routine at a plurality of supply voltages and a plurality of operating frequencies for the at least one system component, one embodiment involves ascertaining those combinations of supply voltages and operating frequencies for the at least one system component for which the at least one system component operates correctly. On the basis of the information regarding those combinations of supply voltages and operating frequencies for the at least one system component for which the at least one system component operates correctly, one embodiment involves ascertaining entries in a lookup table for use within the context of a method for dynamic voltage scaling.

The integrated circuit may be incorporated in an electronic appliance which is ready for operation when the at least one system component is tested. By way of example, the electronic appliance is a mobile electronic appliance, for example a mobile radio subscriber appliance or pocket computer, for example a PDA (Personal Digital Assistant).

In one embodiment, at least one further untested system component from the plurality of system components provides the test routine.

In the case of the method mentioned second above which is provided, the testing of the at least one further system component at a plurality of supply voltages and a plurality of operating frequencies is taken as a basis for ascertaining those combinations of supply voltages and operating frequencies for the at least one system component for which the at least one system component operates correctly. In one embodiment, the information regarding those combinations of supply voltages and operating frequencies for the at least one system component for which the at least one system component operates correctly is taken as a basis for ascertaining entries in a lookup table for use within the context of a method for dynamic voltage scaling.

The integrated circuit may be incorporated in an electronic appliance which is ready for operation when the at least one system component is tested. By way of example, the electronic appliance is a mobile electronic appliance, for example a mobile radio subscriber appliance or a pocket computer, such as PDA (Personal Digital Assistant).

In one embodiment, at least one other untested system component, which does not provide the test routine, is ready for operation when the at least one further system component is tested.

FIG. 1 shows an integrated circuit 100 in line with one exemplary embodiment of the invention.

The integrated circuit 100 implements a system on chip (SoC). In particular, the integrated circuit 100 has a central data processing unit (Central Processing Unit, CPU) 101 and a main memory (Random Access Memory, RAM) 102. The CPU 101 is set up to execute computer programs stored in the main memory 102 and to process data. By way of example, the integrated circuit 100 is used in mobile electronic appliances, such as mobile radio subscriber appliances and mobile computers (for example PDAs, Personal Digital Assistants). Accordingly, the computer programs executed by the CPU 101 are used for data processing in the respective appliance, for example to control a mobile radio subscriber appliance.

In addition, the integrated circuit 100 has a read only memory (ROM) 103 which stores, by way of example, fundamental functions of the integrated circuit 100 in the form of programs which are executed by the CPU 101. The CPU 101 can also execute computer programs stored in the read only memory 103.

In addition to the CPU 101, the integrated circuit 100 has further logic components 104. This involves, by way of example, a coprocessor provided in dedicated fashion for particular tasks (for example for a CRC, Cyclic Redundancy Check) or logic chips which implement interfaces of the system provided by the integrated circuit 100.

The integrated circuit 100 is set up for dynamic voltage scaling (DVS) and accordingly has a DVS control unit 105. The dynamic voltage scaling is implemented by means of a lookup table 106 which is stored in a nonvolatile memory 107 of the DVS control unit 105. The memory 107 can also be part of the (volatile) main memory 102 or part of the read only memory 103.

The lookup table 106 is the basis of the dynamic voltage scaling during the system's operating time and is used within the context of the DVS procedure implemented by the DVS control unit 105. The structure of the lookup table 106 is explained below with reference to FIG. 2.

FIG. 2 shows a lookup table 200 in line with one exemplary embodiment of the invention.

A first column 201 in the lookup table 200 shows the clock frequency domains of the integrated circuit 100 which have the dynamic voltage scaling used for them. The clock frequency domains (clock domains) are areas of the integrated circuit 100 which can be clocked independently of one another. By way of example, the CPU 101 can be clocked independently of one of the further logic components 104, for example an interface chip. That is to say that in this case the CPU 101 and the logic component from the further logic components 104 have different associated clock frequency domains. For each of the clock frequency domains which are shown in the first column 201, a second column 202 in the lookup table 200 shows possible clock frequency settings. A clock frequency setting indicates a clock frequency at which the relevant clock frequency domain of the integrated circuit 100 can be clocked.

A third column 203 in the lookup table 200 has a plurality of subcolumns 204. Each subcolumn corresponds to an operating temperature range for operated temperatures for the integrated circuit 100. For each clock frequency setting shown in column 202, each subcolumn 204 indicates a voltage level value which needs to be used for the clock frequency setting and the operating temperature range corresponding to the subcolumn 204. That is to say that for a particular operating temperature of the integrated circuit 100 the DVS control unit 105 determines that subcolumn 204 in the third column 203 which corresponds to the operating temperature range in which the present operating temperature of the integrated circuit 100 is situated.

The clock frequency setting needed for the present power demand on the integrated circuit 100 in a clock frequency domain determines the row of the subcolumn 204 which contains the voltage level which is ultimately set by the DVS control unit 105 (at least).

If the integrated circuit 100 has a plurality of power supply domains (power domains) that is to say areas which can have a voltage level applied to them independently of one another, then a lookup table 200 is provided in the memory 107 on a similar basis for each voltage range, provided that dynamic voltage scaling is provided for the respective power supply domains.

A calibration method ensures that the lookup table 106 is correct and complete and regularly updated for each power supply domain for which DVS is provided. For this, this exemplary embodiment has a calibration program (calibration code) stored in the main memory 102, which is executed by the CPU 101. The calibration program may also be stored in the read only memory 103 and can be copied to the main memory 102 when it is to be executed. The calibration program may also be stored in an external memory, for example an external flash memory, and can be copied from the flash memory to the main memory 102 before the calibration program is executed. When the calibration program is executed, a calibration procedure is performed which carries out a series of test routines in the course of which critical hardware paths, which allow detection of a malfunction in the integrated circuit 100, are checked.

By way of example the critical hardware paths may be paths in the CPU 101 or in the further logic components 104. The integrated circuit 100 may also have critical hardware paths which are provided only for testing in accordance with the calibration procedure and otherwise have no function.

The calibration procedure (and accordingly the calibration program) can be carried out once or a plurality of times when the integrated circuit 100 is ready for operation and is already incorporated in a mobile radio subscriber appliance which is ready for operation, for example.

The calibration routine involves examining all power supply domains in the system implemented by the integrated circuit 100 which have DVS provided for them. For each of these power supply domains, test routines for a selected portion (for example for certain critical paths) of the power supply domain are executed at various operating points. That selected portion of a power supply domain which is examined in the course of a test routine is subsequently referred to as the tested logic. The operating point for a piece of tested logic is characterized by a set of parameters, for example the clock frequency (or the clock frequencies if the tested logic belongs to a plurality of clock frequency domains), the supply voltage for the tested logic, a well bias voltage or well bias voltages and/or the present operating temperature of the integrated circuit 100.

In the course of the calibration procedure, a test routine for a piece of tested logic is performed repeatedly, with the operating conditions (that is to say the operating point of the tested logic) being changed in steps from pass to pass. The test routine is repeated in this manner at different operating points until a malfunction is detected or a particular set of operating points has been tested in this manner without a malfunction being detected. The operating conditions can be changed in different ways each time the test routine is performed. First, the clock frequency of the tested logic can be held and the supply voltage can be reduced in steps. In addition, the well bias voltage can be varied. To avoid the delay which is caused by the voltage source's settling time, the supply voltage can also be kept constant and the clock frequency can be altered in steps each time the test routine is performed.

The operating temperature of the integrated circuit 100 or of the tested logic can be detected and recorded by means of a temperature sensor. In some test scenarios, for example when the integrated circuit 100 has not yet been incorporated into the appliance in which it is intended to be used, for example when the wafer on which the integrated circuit 100 has been produced is tested, but also when the appliance into which the integrated circuit 100 has already been incorporated is tested, the ambient temperature can be set and thus the test routine can also be carried out for different adjustable operating temperatures. This is also possible when the appliance into which the integrated circuit 100 has been incorporated is ready for operation, for example by virtue of power being supplied to the tested logic or to the circuits or appliance components which are in the surroundings of the tested logic on the integrated circuit 100, and thus the temperature of the tested logic being increased.

Whenever the test routine has been performed, the test response, that is to say the result of the test routine, for example an output value or a memory content, is written to the main memory 102. The result of the test can be analyzed after the test routine has ended, for example the test response can be compared with the test response which is delivered when no errors occur, and in this way it is possible to detect any error. The correct test response, that is to say the test response which is delivered when no errors occur, is determined in advance and is stored in the integrated circuit 100 using a memory which is not part of the tested logic. If the test response delivered by performance of the test routine is identical to the correct test response then the test response can be stored outside of the tested logic and can be used for further evaluation.

In general, the fact that the test response delivered upon performance of a test routine matches the correct test response does not allow the conclusion to be drawn that the tested logic is operating correctly at the operating point at which the test routine was performed. Modern synthesis tools typically produce logic elements with a large quantity of similarly critical paths. If the tested logic has a plurality of critical paths on account of on-chip variations and the process variation, it is not possible to say a priori which of these critical paths will fail first. It is possible that when the test routine is performed an error will occur in one of the tested critical paths which cannot be detected using the test response. Therefore, an error may occur during testing which cannot be detected using the test response but possibly results in an inadmissible state for the circuit which causes a permanent or relatively lengthy malfunction. For this reason, in one exemplary embodiment of the invention the tested logic is reset to an operating point which is outside the safe operating range after every pass of the test routine.

As mentioned, the calibration procedure is performed by the CPU 101 in the course of execution of the calibration code. The calibration procedure uses resources of the system implemented by the integrated circuit 100, such as the main memory 102 for storing the test response or a system timer. In the course of the performance of a test routine, the tested logic is supplied with a test pattern, which can be generated by the CPU 101 in the course of execution of the calibration code, but may also be stored in the integrated circuit 100, for example in the read only memory 103. The integrated circuit 100 may also have a test pattern generator 108 which is set up to generate test patterns.

In the course of the performance of a test routine, the tested logic is tested for one or more clock cycles at a critical operating point, for example, which is outside of the safe operating range, that is to say for which it is not certain that the integrated circuit 100 operates correctly at this operating point.

The integrated circuit 100 may have a dedicated performance monitor 109 which is used as tested logic for one or more passes of a test routine. The performance monitor 109 can, as already mentioned above, implement critical paths, which are used for no further function, which allow statements to be made about the critical paths in the system. The performance monitor 109 may also have critical paths in the system as a copy. The performance monitor 109 can be configured by the CPU 101 when it executes the calibration code. The safe operating range (that is to say the set of operating points at which no errors occur) of the system implemented by the integrated circuit 100 can be determined on the basis of the safe operating range of the performance monitor 109, that is to say on the basis of the set of operating points at which the performance monitor 109 operates correctly, for example using predetermined correlation values which reflect the link between the function of the critical paths in the performance monitor 109 and the critical paths in the (rest of the) system, or possibly other test results.

If the correlation between the manner of operation (or the timing properties) of the critical paths in the performance monitor 109 is known only with a low level of certainty, it is advantageous if the actual critical paths in the integrated circuit 100 are used for testing.

As described above, the fact that the performance of a test routine at an operating point has delivered the correct test result cannot be used to safely deduce that the operating point is in the safe operating range of the system. Therefore, in one embodiment the limits of the safe operating range of the system are calculated from the operating points at which no errors have occurred using a safety margin in which the possible on-chip variations of the critical paths in the system are taken into account. As is utilized particularly when a performance monitor 109 is used, it is not necessary for all critical paths to be examined. Provided that it is possible to determine a sufficiently accurate correlation between the critical paths in the system, results about the safe operating range of a critical path can also be used for another critical path.

If the integrated circuit 100 has been developed in line with a new design or if it exhibits a new technology, so that there is only a limited statistical basis for its properties, particularly in order to make statements about the correlation of critical paths in the integrated circuit 100, a large safety margin is used.

The critical paths in the integrated circuit 100 are ascertained within the context of static timing analysis (STA). This is a standard tool within the context of the development process of the hardware.

The test routines which are performed in the course of the calibration procedure can be extended if new error patterns are discovered in the application of the integrated circuit 100, for example while the electronic appliance in which the integrated circuit 100 is used is being tested or in the course of prototype tests. Thus, new test routines can be included which allow the detection of errors which could not be detected in the course of the calibration procedure using the previously provided test routines. If a broader statistical basis is created for an integrated circuit 100 over the course of time, the calibration procedure can be optimized and the safety margin can be reduced, which means that ultimately a further reduction in the power consumption of the integrated circuit 100 can be achieved. By way of example, if the use of the integrated circuit 100 has allowed experience to be gained about its properties, the manufacturer of the integrated circuit 100 can provide a newer version of the calibration code which corresponds to an optimized calibration procedure, and the new calibration code can be loaded, by means of an update, into the read only memory 103 of an integrated circuit 100 which is used in an electronic appliance.

On the basis of the results of the calibration procedure, that is to say the determination of the safe operating range for the integrated circuit 100, the lookup table 106 is updated. The entries in the lookup table 106 are therefore modified, if appropriate such that no malfunctions occur when the voltage levels of the power supply domains for which DVS is provided are set in line with the lookup table 106.

It is also possible to store further results from the calibration procedure in a nonvolatile memory, and earlier results can be used for successive optimization of the lookup table 106.

In one embodiment, the performance of a test routine is terminated after a predetermined time and the evaluation of the test response is started. By way of example, this ensures that the tested logic does not enter a continuous loop and a test routine is never terminated. For this purpose, the integrated circuit 100 may have a test timer 110, which is not part of the tested logic and terminates the execution of the test routine by resetting the tested logic (for example using a reset signal) after a maximum permissible execution time for performing the test routine has elapsed. As FIG. 1 shows, the test timer 110 may be a system component of the integrated circuit 100 and may be implemented by hardware, but may also be implemented by a program executed by means of the CPU 101, that is to say may be a software timer.

The test timer may be a timer for the system, for example a watchdog timer which is provided on the integrated circuit 100. The tested logic can be reset by the CPU 101 or, in the case of a hardware timer, also by the timer directly.

In one exemplary embodiment, in which the calibration procedure is performed and the integrated circuit 100 is already incorporated in the final system, for example a mobile radio subscriber appliance, a specific piece of hardware is provided which, when a test routine is performed, isolates the tested logic from the logic which controls the performance of the test routine. This may be necessary in some cases, because failure of the tested logic during performance of a test routine can result in an unforeseeable state for the tested logic which can corrupt the state of the circuit which surrounds the tested logic if no isolation is provided. By way of example, the tested logic needs to be isolated at least from the test timer 110, from the storage locations in the main memory 102 which contain the code for the test routine, the test data and all other codes and other data which are required for normal operation of the integrated circuit 100.

If a test routine is to be performed when the electronic appliance which has the incorporated integrated circuit 100 is used, that is to say is at least ready for operation, it may need to be executed without the normal operation of the system implemented by the integrated circuit 100 being influenced. In this case, no alteration in the response of the electronic appliance arises for the user of the electronic appliance apart from a temporary change in power consumption, which may be unavoidable but is typically unnoticeable.

By way of example, the test routines can be executed when the tested logic is in an inactive state. If the integrated circuit 100 is incorporated in a mobile radio subscriber appliance then the test routines can be executed when the mobile radio subscriber appliance is in a standby mode, for example. Even in the case of an inactive state, however, it may be necessary for the tested logic to be isolated from the circuit parts which surround it in order to avoid an unwanted state change for the circuit parts which surround the tested logic. The isolation logic needs to meet certain requirements in order to ensure this. By way of example, the state of an output from the electronic appliance must not change on account of the performance of the calibration procedure. Furthermore the system which is implemented by the integrated circuit 100 needs to react to the request to return to normal operation without any noticeable delay. The length of the test routines is chosen such that this is ensured, and the test routines are possibly divided into short test sequences in order to ensure this. If appropriate, the calibration procedure is synchronized with the planned activity phases for the system (or parts of the system).

The isolation logic can be activated by a logic element outside of the tested logic or else by the tested logic itself so long as it operates within a range which is known to be part of the safe operating range. Only after the isolation has been carried out in full is the operating point permitted to leave this range, which is subsequently referred to as the operating range known to be safe.

The test responses are evaluated in the course of execution of the calibration code by the CPU 101. In another embodiment, a special piece of hardware is provided which evaluates the test response. The lookup table 106 is updated by the calibration procedure in the course of execution of the calibration code by the CPU 101.

In one embodiment, the CPU 101 itself has critical paths which are tested in the course of the calibration, and is therefore the tested logic when certain test routines themselves are executed. In particular, in this case the test response can be provided by the calibration procedure, which is executed in the course of execution of the calibration code by the CPU 101, only when the CPU 101 is operating within its operating range which is known to be safe. A test routine in which the CPU 101 is the tested logic can be prepared and started by the CPU 101 itself so long as the CPU 101 is operating within its operating range which is known to be safe. The change in the operating point such that it is no longer within the operating range which is known to be safe needs to be made by hardware outside of the tested logic, that is to say in this case by hardware which is not part of the CPU 101. When the test routine has been terminated by the test timer 110 and the CPU 101 has been reset by the test timer 110, the CPU 101 can start operating again within its operating range which is known to be safe, for example at reduced frequency in comparison with the operating point at which the test routine was carried out, and can evaluate the test routine's test response, can store the result of the evaluation and can prepare a subsequent pass of the test routine or a subsequent other test routine. In this case, a special piece of hardware, for example the hardware which causes the operating point to change to a range outside of the safe operating range, ensures that after the CPU 101 has been reset the system implemented by the integrated circuit 100 operates within the operating range which is known to be safe, for example by reducing the clock frequency in comparison with the operating point at which the test routine was carried out.

It is also necessary for startup of the CPU 101 to involve reset of the CPU 101 being followed by the CPU 101 being able to detect that the reason for the startup was a reset after termination of a test routine. By way of example, the CPU 101 can establish this by checking a stored state information item, for example by checking a status bit in the test timer 110 which, when set, signals that the test timer has expired. If the CPU 101 establishes upon startup that the reason for the startup is a reset after termination of a test routine then the startup routine branches to execution of the parts of the calibration code for which the test response is evaluated and the result of the evaluation is stored.

An example of the execution of a calibration procedure is explained below with reference to FIG. 3.

Figure 3:
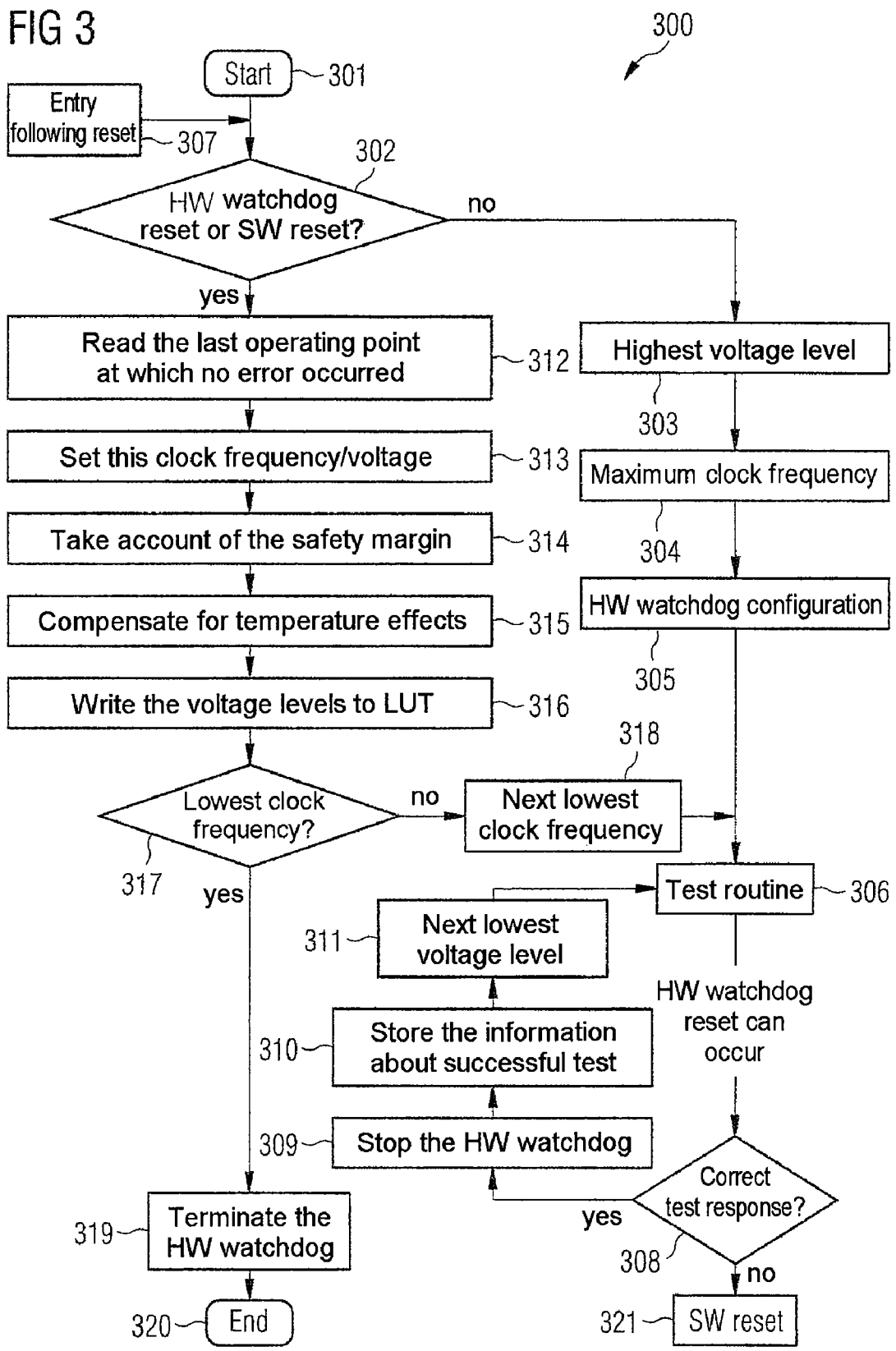
FIG. 3 shows a flowchart in line with one exemplary embodiment of the invention.

FIG. 3 shows a flowchart 300 in line with one exemplary embodiment of the invention.

The execution shown in FIG. 3 is used for updating or else for initially creating the lookup table 106 for the integrated circuit 100. The execution shown is the execution of a calibration procedure which is carried out in the course of the execution of a calibration code by the CPU 101. In this example, the test timer 110 is a hardware watchdog.

In this example, the tested logic is always the same for the sake of simplicity, but different parts of the integrated circuit 100 may also be used as tested logic in the course of the calibration procedure. In addition, it is assumed that only one power supply domain is provided for the DVS with a single clock frequency domain. If there are a plurality of clock frequency domains and/or a plurality of power supply domains with one or more clock frequency domains then the execution shown is carried out for each clock frequency domain of each power supply domain.

The calibration procedure starts in step 301 at the start of execution of the calibration code by the CPU 101.

In step 302, a check is performed to determine whether a hardware watchdog reset has occurred, that is to say whether the tested logic has been reset by the test timer 110 or a software reset has occurred, that is to say that the tested logic has been reset by the CPU 101 in the course of execution of the calibration code.

Directly after the start of the calibration procedure, this is not the case and the execution branches to step 303.

In step 303, the operating voltage of the tested logic is set to the highest value. In step 304, the clock frequency at which the tested logic is operated is set to the highest value. Clearly, in steps 303 and 304, an operating point for the tested logic is chosen which is subsequently altered gradually until an error in the tested logic occurs (or all possible operating points have been tested).

In step 305, the test timer 110 is configured in suitable fashion for the calibration. In particular, a maximum period (or a maximum number of clock cycles) is chosen for which a test routine needs to be performed.

In step 306, a test routine for the tested logic is performed at the currently set operating point of the tested logic. In this case, by way of example, the CPU 101 feeds a test pattern into the tested logic which is processed by the tested logic. If, upon execution of the test routine, the maximum period (or the maximum number of clock cycles) for executing the test routine is exceeded then this is established by the test timer 110 and it resets the tested logic. In this case, the execution is continued at step 302, which is indicated in FIG. 3 by block 307.

If the tested logic is not reset by the test timer 110 then the execution is continued at step 308 and the CPU 101 checks, in the course of execution of the calibration code, whether the tested logic has delivered the correct test response. If this is not the case then the CPU 101 resets the tested logic in step 321 in the course of execution of the calibration code, and the execution is continued at step 302 (likewise indicated by block 307).

If the tested logic has delivered the correct test response then the test timer 110 is stopped in step 309 and is reset to the maximum period (or the maximum number of clock cycles) for execution of a test routine.

In step 310, the main memory 102 is used, by way of example, in the form of a calibration log to store the information that no error has occurred at the currently set operating point for the tested logic.

In step 311, the operating point for the tested logic is altered such that the next lowest voltage level (in comparison with the currently set voltage level) is set and the execution is carried out with the next pass of the test routine in step 306.

If it is established in step 302 that the tested logic has been reset, either by the test timer 110 or by the CPU 101 in the course of execution of the calibration code, then the execution is continued at step 312. The operating point at which there was last no error to occur is read from the stored calibration log, and this operating point is set for the tested logic in step 313. Clearly, the operating point chosen for the tested logic is that for which it was last established in the course of the calibration procedure that the tested logic is operating correctly.

This operating point indicates for the currently set clock frequency for the tested logic the minimum operating voltage at which the tested logic operates correctly. On the basis of this information, the lookup table 106 is updated in steps 314 to 316. In step 314, a safety margin is taken into account. In step 315, temperature compensation is performed, so that the voltage levels which are intended to be set at the currently set clock frequency are known for all ranges of the operating temperature of the integrated circuit 100 (in line with the subcolumns 204 in table 200). Finally, in step 316, the calculated values for the voltage levels which are to be set at the currently set clock frequency are written to the lookup table 106, that is to say that the entries in the subcolumns 204 are entered in the row of the lookup table 200 which corresponds to the currently set clock frequency (in column 202).

In step 317, a check is performed to determine whether the currently set clock frequency is the lowest supported clock frequency. If this is not the case then the execution is continued at step 318 by altering the operating point for the tested logic such that the clock frequency which is next lowest to the currently set clock frequency is set. The execution is then continued with the next pass of the test routine in step 306.

If it is established in step 317 that the clock frequency currently set for the tested logic is the lowest supported clock frequency then execution continues at step 318 by deactivating the test timer for its use in the course of the calibration. Next, the calibration procedure is terminated in step 320.

In one embodiment, there is a further step between step 310 and step 311, in which the tested logic is reset for the sake of safety. In step 302, this embodiment involves a check to determine whether the tested logic has been reset in this further step, and if this is the case then the execution is continued at step 303, and only if a hardware watchdog reset has occurred or the tested logic has been reset in line with step 321 is the execution continued at step 312.

As indicated in step 315, a voltage level is processed further for a clock frequency in one embodiment before it is stored in the lookup table 106, so that the DVS control unit 105 has suitable values available for the entire range of the operating temperatures for the integrated circuit 100. A voltage level $V\_LEVEL_{lut}$ which is stored in the lookup table 106 can be chosen to be at a value $V\_LEVEL_{cal}$, determined for the relevant clock frequency setting, for the voltage level (that is to say the voltage level which has been set in step 313 and possibly scaled in step 314 on the basis of a safety margin) in line with the following procedures:

temperature variations are taken into account using a static margin during calibration. This is used, by way of example, when the DVS control unit 105 has no mechanisms for compensating for temperature effects. It is then possible to calculate a voltage level $V\_LEVEL_{lut}$ which is calculated from the value $V\_LEVEL_{cal}$ and can be used for all operating temperatures of the integrated circuit 110 (in this case, only one subcolumn 204 is provided). This is done, by way of example, on the basis of $$V\_LEVEL_{lut} = V\_LEVEL_{cal} + M(T_{cal})$$

where $T_{cal}$ is the operating temperature of the integrated circuit at the time at which the calculated voltage level V_LEVEL$_{cal}$ is determined, as at the time in which the calibration procedure (or the relevant test routines) is performed, and M is a margin which allows the use of a value V_LEVEL$_{lut}$ for all operating temperatures. M can be chosen on the basis of T$_{cal}$.

In this case, a single voltage level is therefore provided for all operating temperatures for a particular clock frequency setting, and during operation the DVS control unit 105 chooses this value when the relevant clock frequency has been set, regardless of the operating temperature.

Another option is for the DVS control unit 105 to have mechanisms for compensating for temperature effects and to use a relevant formula to scale the value indicated by the lookup table 106 before it is used to set the operating temperature. The value V_LEVEL$_{lut}$ which is stored for a value V_LEVEL$_{cal}$ in the lookup table 106 is in this case determined, by way of example, on the basis of $$V\_LEVEL_{lut} = func_1(V\_LEVEL_{cal}, T_{cal}),$$

where T$_{cal}$ denotes the temperature at the time at which the calibration procedure is performed, as above, and func$_1$ denotes a suitable function for calculating V_LEVEL$_{lut}$, so that the DVS control unit 105 can calculate voltage levels from the value V_LEVEL$_{lut}$ at the time of execution which have been dynamically scaled to compensate for temperature effects.

In this case, too, the lookup table 106 stores just one value for each clock frequency setting (in each case for each clock frequency domain) for the entire operating temperature range. However, the DVS control unit 105 uses this stored value during execution time not just for setting the voltage level (in line with the present clock frequency), but rather calculates the value according to which the present voltage level is set on the basis of the present operating temperature from the value stored in the lookup table 106 (for the present clock frequency).

In addition, it is possible for the lookup table 106 to indicate a respective value for a voltage level for clock frequency setting and for a plurality of operating temperatures, and for the DVS control unit 105 to use interpolation of these values to calculate a voltage level for the present operating temperature, said voltage level being used to set the operating voltage. In addition, it is possible for the DVS control unit 105 to associate the present operating temperature with an operating temperature range and for a respective voltage level to be stored in the lookup table 106 for a plurality of operating temperature ranges, as illustrated in FIG. 2 in line with the plurality of subcolumns 204. The value V_LEVEL$_{lut}$ which is stored for an operating temperature range ΔT$_i$ (i=1, . . . , n) in the lookup table 106 is determined, by way of example, on the basis of $$V\_LEVEL_{lut}[\Delta T_i] = func_2(V\_LEVEL_{cal}, T_{cal}),$$

where, as above, T$_{cal}$ denotes the temperature at the time of the calibration procedure and func$_2$ denotes a suitable function for calculating V_LEVEL$_{lut}$ for each operating temperature range ΔT$_i$.

In this case, the DVS control unit 105 associates the present operating temperature with a suitable operating temperature range ΔT$_i$ at the execution time and reads the voltage level indicated in line with the present clock frequency and the operating temperature range in the lookup table 106. This voltage level is then used by the DVS control unit 105 to set the present operating voltages for the integrated circuit 100.

As mentioned above, a plurality of power supply domains may be provided, and the aforementioned procedures apply accordingly to each power supply domain.

In one embodiment, the calibration procedure is performed only once, for example when the integrated circuit 100 is produced. In this case, the content of the lookup table 106, as created during the calibration procedure, is valid for the entire life of the system. In this case, there is no need to update the content of the lookup table 106 as soon as the calibration procedure has been terminated. The lookup table 106 may be stored in a read only memory in this case. For permanent storage of the lookup table 106 within the system, there are several options, for example a memory which can be programmed a single time, a flash memory or a plurality of fuses.

In another embodiment, the calibration procedure is performed several times in the course of the life of the system and accordingly the lookup table 106 is updated at least once. This can be done particularly when, during production of the integrated circuit 100, an original lookup table 106 is stored in the memory 107. By way of example, the calibration procedure can be performed when the system is started, for example when starting a mobile radio subscriber appliance which has the integrated circuit 100 incorporated in it, when the system is shut down or at times in which the system is idle. If the lookup table 106 is updated at least once, it is necessary for the memory 107 to be a rewritable memory, for example a flash memory.

If the lookup table 106 is produced whenever the system is started, it is not necessary for the memory 107 to be nonvolatile, but rather the lookup table 106 can also be stored in a volatile memory.

By way of example, the memory 107 may in this case be part of the main memory 102.

If the calibration procedure is performed several times during the life of the system, it is particularly possible for the calibration procedure to be performed shortly after times at which the system has had a heavy utilization level, which means that during the calibration procedure the operating temperature of the integrated circuit 100 is still high on account of the preceding high level of activity and thus voltage level values can be determined which are valid for a high operating temperature.

In one embodiment the calibration procedure is used to determine the process class of the integrated circuit 100. In this case, the entries in the lookup table 106 which are not optimized for certain appliances are determined in a different manner than using the calibration procedure described above, for example using STA for the worst case process. The lookup table 106 is stored in the memory 107, which in this embodiment is a permanent read only memory, and contains voltage level values for different process classes. The calibration procedure is then performed and the results are compared with the values which are contained in the lookup table 106. Depending on the process class to which the values with which the results of the calibration procedure have a sufficiently good match correspond, the integrated circuit 100 can be associated with a process class. Particularly in this embodiment, a dedicated performance monitor may be provided.

Hence, embodiments of the invention can be used to ascertain the individual process parameters when producing the integrated circuit 100.

In the exemplary embodiment described above, the performance of the calibration procedure is controlled by the CPU 101 in the course of execution of the calibration code. This is possible, in particular, when the integrated circuit 100 is already incorporated in the final system, for example in a mobile radio subscriber appliance. In particular, in this case it is possible for the integrated circuit 100 to use the resources of the final system, for example a power supply. The calibration procedure can also be performed when the integrated circuit 100 has not yet been incorporated into the final system. In this case, external test hardware may be provided which provides a power supply for the integrated circuit 100, for example. In one embodiment, an external test system is provided which undertakes control of the calibration procedure instead of the CPU 101. Such an exemplary embodiment is explained below.

Figure 4:
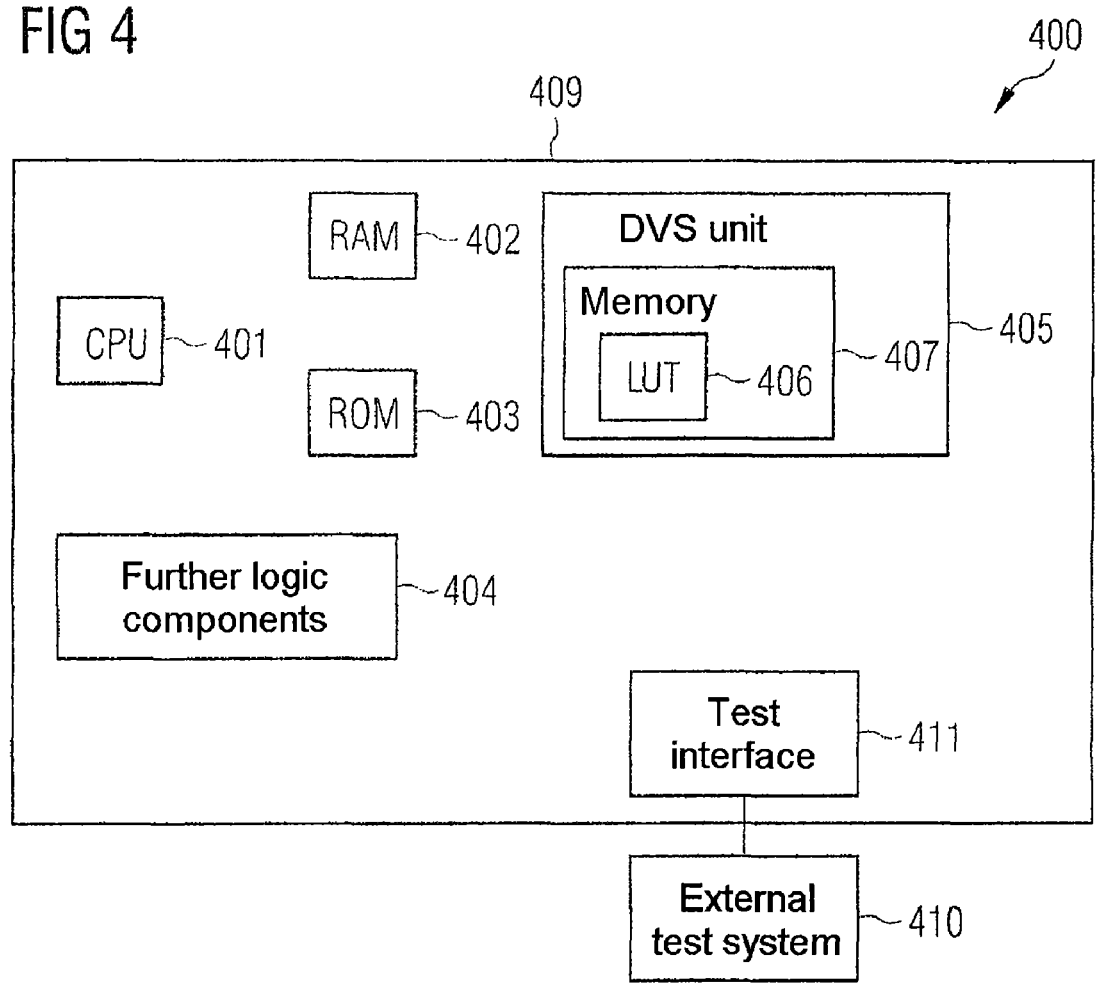
FIG. 4 shows a test arrangement in line with one exemplary embodiment of the invention.

FIG. 4 shows a test arrangement 400 in line with one exemplary embodiment of the invention.

The test arrangement 400 has an integrated circuit 409 and an external test system 410. In similar fashion to the integrated circuit 100, the integrated circuit 409 has a CPU 401, a main memory 402, a read only memory 403, further logic components 404 and a DVS control unit 405. The DVS control unit 405 is set up and configured in similar fashion to the DVS control unit 105 in the integrated circuit 100 shown in FIG. 1 and, in particular, has a memory 407 in which a lookup table 406 is stored. The integrated circuit 409 also has a test interface 411 which is used to couple the integrated circuit 409 to the external test system 410.

In this exemplary embodiment, the external test system 410 undertakes control of the calibration procedure for updating (or else for initially filling) the lookup table 406. The external test system may be hard wired or may execute a calibration code. In the course of the execution of the calibration code, the calibration procedure is performed. The integrated circuit 409 is controlled in the course of the calibration procedure using the test interface 411. In particular, the external test system 410 can use the test interface 411 in the course of a test routine which is performed in the course of the calibration procedure to supply a test pattern and to read the result of the processing of the test pattern by the tested logic in the course of the test routine, that is to say the test response.

In similar fashion to the exemplary embodiment described above, a test timer is used in the course of the calibration procedure. This can likewise be provided by means of the external test system 410 and can communicate with the integrated circuit 409 using the test interface 411.

The test pattern supplied to a tested piece of logic can be generated by the external test system 410 or may be permanently stored in the memory of the external test system 410.

In one exemplary embodiment, the integrated circuit 409 which, as mentioned, has not yet been incorporated into the final system is not capable of operation without external resources. These are made available to it by the external test system 410. By way of example, the external test system 410 can, as mentioned, supply the integrated circuit 409 with power and can provide or emulate system functions of the final system for which the integrated circuit 409 is provided and which are required for operation of the integrated circuit 409. The external test system 410 can also provide an external memory for the integrated circuit 409.

The test patterns are supplied to a tested piece of logic, for example using a scan path, which is also used for the appliance test.

The calibration procedure can be performed in similar fashion to the exemplary embodiment above, in a way it is described with reference to FIG. 3, with the difference that the calibration procedure is controlled by the external test system 410. In particular, by way of example, the tested logic is reset not by the CPU 401 but rather by the external test system 410 when the test response from a test routine does not match the correct test response.

The invention claimed is:

1. A method for ascertaining an operating range for an integrated circuit, comprising:
   performing a test routine on at least one system component from a plurality of system components in the integrated circuit, wherein the test routine includes setting a plurality of supply voltages and setting a plurality of operating frequencies to test the at least one system component,
   wherein the at least one system component is not in operation when the at least one system component is tested, and at least one other untested system component from the plurality of system components is in operation during testing of the at least one system component.

2. The method as claimed in claim 1, further comprising ascertaining, based on the performance of the test routine at a plurality of supply voltages and a plurality of operating frequencies for the at least one system component, those combinations of supply voltages and operating frequencies for the at least one system component for which the at least one system component operates correctly.

3. The method as claimed in claim 2, further comprising ascertaining, based on the information regarding those combinations of supply voltages and operating frequencies for the at least one system component for which the at least one system component operates correctly, entries in a lookup table for use within the context of a method for dynamic voltage scaling.

4. The method as claimed in claim 1, wherein the integrated circuit is incorporated in an electronic appliance which is configured to operate during the testing of the at least one system component.

5. The method as claimed in claim 4, wherein the electronic appliance is a mobile electronic appliance.

6. The method as claimed in claim 1, further comprising ascertaining, based on the test result from the test routine, whether the at least one system component is operating correctly.

7. The method as claimed in claim 1, further comprising performing the test routine for testing the at least one system component for various values of influencing parameters which influence the response of the integrated circuit.

8. The method as claimed in claim 1, wherein at least one further untested system component from the plurality of system components provides the test routine.

9. A method for ascertaining an operating range for an integrated circuit having a plurality of system components, comprising:
   providing a test procedure by at least one system component from a plurality of system components in the integrated circuit; and
   testing at least one further system component from a plurality of system components wherein the testing step includes setting a plurality of supply voltages and setting a plurality of operating frequencies to test the at least one further system component in line with the test procedure,
   wherein the test procedure occurs during operation of the integrated circuit.

10. The method as claimed in claim 9, further comprising ascertaining, based on the testing of the at least one further system component at a plurality of supply voltages and a plurality of operating frequencies, those combinations of supply voltages and operating frequencies for the at least one system component for which the at least one system component operates correctly.

11. The method as claimed in claim 10, further comprising ascertaining, based on the information regarding those combinations of supply voltages and operating frequencies for the at least one system component for which the at least one system component operates correctly, entries in a lookup table for use within the context of a method for dynamic voltage scaling.

12. The method as claimed in claim 9, wherein the integrated circuit is incorporated in an electronic appliance which is configured to operate during the testing of the at least one system component.

13. The method as claimed in claim 12, wherein the electronic appliance is a mobile electronic appliance.

14. The method as claimed in claim 9, wherein at least one other untested system component, which does not provide the test routine, is operable during the testing of the at least one further system component.

15. An integrated circuit comprising:
a plurality of system components,
wherein at least one system component from the plurality of system components provides a test procedure, and
wherein the test procedure is performed during operation of the integrated circuit and is taken as a basis for testing at least one further system component from the plurality of system components, wherein the test procedure includes setting a plurality of supply voltages and setting a plurality of operating frequencies to test the at least one further system component.

16. The integrated circuit as claimed in claim 15, further comprising a dynamic voltage scaling control unit having a lookup table and configured to perform dynamic voltage scaling, which is based on lookup table entries for those combinations of supply voltages and operating frequencies for the at least one further system component for which the at least one further system component operates correctly.

17. The integrated circuit as claimed in claim 15, further comprising a test pattern generator configured to generate a test pattern used to test the at least one further system component.

18. The integrated circuit as claimed in claim 15, further comprising a test interface configured to couple the integrated circuit with an external test system.

19. The integrated circuit as claimed in claim 15, further comprising a test timer configured to terminate the execution of the test procedure by resetting the at least one further system component after a maximum permissible execution time for executing the test procedure.

20. A method for ascertaining an operating range for an integrated circuit, comprising:
performing a test routine for testing at least one system component from a plurality of system components in the integrated circuit, wherein the test routine includes setting a plurality of supply voltages and setting a plurality of operating frequencies to test the at least one system component; and
ascertaining, based on the performance of the test routine, those combinations of supply voltages and operating frequencies for the at least one system component for which the at least one system component operates correctly,
wherein the at least one system component is not in operation when the at least one system component is tested, and at least one other untested system component from the plurality of system components is ready for operation when the at least one system component is tested.

21. The method as claimed in claim 20, wherein the integrated circuit is incorporated in an electronic appliance which is configured to operate ready for operation when the at least one system component is tested.

22. The method as claimed in claim 21, wherein the electronic appliance is a mobile electronic appliance.

23. The method as claimed in claim 20, further comprising ascertaining, based on the test result from the test routine, whether the at least one system component is operating correctly.

24. The method as claimed in claim 20, further comprising performing the test routine for testing the at least one system component for various values of influencing parameters which influence the response of the integrated circuit.

25. The method as claimed in claim 20, further comprising ascertaining, based on the information regarding those combinations of supply voltages and operating frequencies for the at least one system component for which the at least one system component operates correctly, entries in a lookup table for use within the context of a method for dynamic voltage scaling.

26. The method as claimed in claim 20, wherein at least one further untested system component from the plurality of system components provides the test routine.

27. A method for ascertaining an operating range for an integrated circuit having a plurality of system components, comprising:
providing a test procedure by at least one system component from a plurality of system components in the integrated circuit;
testing at least one further system component from a plurality of system components by setting a plurality of supply voltages and setting a plurality of operating frequencies to test the at least one further system component in line with the test procedure; and
ascertaining, based on the testing, those combinations of supply voltages and operating frequencies for the at least one system component for which the at least one system component operates correctly.

28. The method as claimed in claim 27, wherein the integrated circuit is incorporated in an electronic appliance which is ready for operation when the at least one system component is tested.

29. The method as claimed in claim 28, wherein the electronic appliance is a mobile electronic appliance.

30. The method as claimed in claim 27, further comprising ascertaining, based on the information regarding those combinations of supply voltages and operating frequencies for the at least one system component for which the at least one system component operates correctly, entries in a lookup table for use within the context of a method for dynamic voltage scaling.

31. The method as claimed in claim 27, wherein at least one other untested system component, which does not provide the test routine, is ready for operation when the at least one further system component is tested.

32. An integrated circuit comprising:
a plurality of system components,
wherein at least one system component from the plurality of system components provides a test procedure, and
wherein the test procedure is taken as a basis for testing at least one further system component from the plurality of system components, wherein the test procedure includes setting a plurality of supply voltages and setting a plurality of operating frequencies to test the at least one further system component, and for ascertaining, based on the testing, those combinations of supply voltages and operating frequencies for the at least one system component for which the at least one system component operates correctly.

33. The integrated circuit as claimed in claim 32, further comprising a dynamic voltage scaling control unit having a lookup table and configured to perform dynamic voltage scaling, which is based on lookup table entries for those combinations of supply voltages and operating frequencies for the at least one further system component for which the at least one further system component operates correctly.

34. The integrated circuit as claimed in claim 32, further comprising a test pattern generator configured to generate a test pattern used to test the at least one further system component.

35. The integrated circuit as claimed in claim 32, further comprising a test interface configured to couple the integrated circuit with an external test system.

36. The integrated circuit as claimed in claim 32, further comprising a test timer configured to terminate the execution of the test procedure by resetting the at least one further system component after a maximum permissible execution time for executing the test procedure.

* * * * *